(12) United States Patent
Ostwald

(10) Patent No.: US 6,393,335 B1
(45) Date of Patent: May 21, 2002

(54) SYNCHRONOUS MOUNTING AND DISMOUNTING METHOD AND SYSTEM FOR MULTIPLE ACCESSOR STORAGE LIBRARIES

(75) Inventor: Timothy C. Ostwald, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/617,883

(22) Filed: Jul. 17, 2000

(51) Int. Cl.7 .................................................. G06F 7/00
(52) U.S. Cl. ........................ 700/214; 700/216; 700/217; 414/273; 414/275; 901/1; 901/8; 901/50
(58) Field of Search ................................ 700/214, 216, 700/217; 414/273, 275; 901/1, 8, 50

(56) References Cited

U.S. PATENT DOCUMENTS

| | | | | |
|---|---|---|---|---|
| 3,661,284 A | * | 5/1972 | Traube | 214/152 |
| 3,677,420 A | * | 7/1972 | Cotton et al. | 214/16.4 A |
| 3,771,679 A | * | 11/1973 | Theml | 214/152 |
| 4,780,817 A | * | 10/1988 | Lofgren | 180/168 |
| 5,133,632 A | * | 7/1992 | Aramaki et al. | 414/283 |
| 5,283,739 A | * | 2/1994 | Summerville et al. | 364/424.02 |
| 5,395,199 A | * | 3/1995 | Day, III et al. | 414/267 |
| 5,456,569 A | | 10/1995 | Cheatham et al. | |
| 5,536,128 A | * | 7/1996 | Shimoyashiro et al. | 414/273 |
| 5,548,521 A | * | 8/1996 | Krayer et al. | 364/478.02 |
| 5,557,528 A | | 9/1996 | Munro et al. | |
| 5,646,918 A | | 7/1997 | Dimitri et al. | |
| 5,818,723 A | | 10/1998 | Dimitri | |
| 5,955,857 A | * | 9/1999 | Kwon et al. | 318/568.11 |
| 5,956,301 A | | 9/1999 | Dimitri et al. | |
| 5,974,348 A | * | 10/1999 | Rocks | 701/28 |
| 6,029,230 A | | 2/2000 | Ng | |
| 6,038,490 A | | 3/2000 | Dimitri et al. | |
| 6,134,482 A | * | 10/2000 | Iwasaki | 700/121 |
| 6,262,863 B1 | * | 7/2001 | Ostwald et al. | 360/92 |

FOREIGN PATENT DOCUMENTS

| | | |
|---|---|---|
| DE | 36 12 531 | 11/1986 |
| WO | 97 41559 | 11/1997 |
| WO | 01 41137 | 7/2001 |

* cited by examiner

Primary Examiner—Christopher P. Ellis
Assistant Examiner—Jeffrey A. Shapiro
(74) Attorney, Agent, or Firm—Brooks & Kushman P.C.

(57) ABSTRACT

An automated storage library for the storage and retrieval of cartridges and an associated method includes a frame having cartridge storage cells for storing cartridges and at least one cartridge player for playing a cartridge. At least two robotic mechanisms are each movable within the frame to mount a cartridge from a cartridge storage cell into the cartridge player and to dismount a cartridge from the cartridge player into a cartridge storage cell. A controller controls the robotic mechanisms to move in a first direction around the frame along a closed loop such that one of the robotic mechanisms dismounts a cartridge from the cartridge player into a cartridge storage cell while another one of the robotic mechanism mounts another cartridge from another cartridge storage cell into the cartridge player. The controller controls the robotic mechanisms such that the one of the robotic mechanisms unloads the cartridge from the cartridge player prior to the other one of the robotic mechanisms loading the other cartridge into the cartridge player.

15 Claims, 5 Drawing Sheets

SYNCHRONOUS MOUNTING AND DISMOUNTING METHOD AND SYSTEM FOR MULTIPLE ACCESSOR STORAGE LIBRARIES

TECHNICAL FIELD

The present invention relates generally to automated storage libraries having robotic accessors or mechanisms that manipulate media cartridges and, more particularly, to a synchronous mounting and dismounting method and system for a storage library having multiple robotic mechanisms.

BACKGROUND ART

Existing automated storage libraries are capable of storing and retrieving large quantities of information stored on media cartridges. This is accomplished by the use of a large number of cartridge storage cells, each of which houses a media cartridge, that are housed within an enclosure. Such storage libraries use a robotic mechanism or picker to move the media cartridges between their media cartridge storage cells and media cartridge players. For example, to retrieve information stored on a selected media cartridge, a robotic mechanism moves to a location opposite the media cartridge storage cell that houses the selected media cartridge. An end effector of the robotic mechanism then grasps the media cartridge and extracts it from the media cartridge storage cell to a media drive where the end effector loads the media cartridge into the drive.

A typical storage library includes tracks or rails laid out throughout the storage library. Robotic mechanisms are mounted to the tracks to move throughout the storage library to access the cartridges and the drives. A problem occurs when two robotic mechanisms contend for access to the same resources such as a drive. For instance, one robotic mechanism may be waiting to load or mount a drive while another robotic mechanism is unloading or dismounting the same drive. Typical storage libraries do not unlink the mounting operation from the dismounting operation. A method and system for a storage library having multiple mechanisms which makes the mounting functions independent of the dismounting functions would improve the mounting time rate and the overall throughput of the storage library.

SUMMARY OF THE INVENTION

Accordingly, it is an object of the present invention to provide a synchronous mounting and dismounting method and system for a storage library having robotic mechanisms.

It is another object of the present invention to provide a method and system for a storage library having robotic mechanisms which make the mount functions performed by the robotic mechanisms to be independent of the dismount functions performed by the robotic mechanisms.

It is a further object of the present invention to provide a method and system for a storage library having robotic mechanisms which make the robotic mechanisms move around the storage library along a looping travel path for enabling the dismounting of media cartridges from locations within the storage library to be done independently as a background function to the mounting of media cartridges to other locations within the storage library.

It is still another object of the present invention to provide a method and system for a storage library having robotic mechanisms which control the robotic mechanisms to move around the storage library along a looping travel path in the same direction such that there is no contention between the robotic mechanisms during mounting and dismounting of different media cartridges from locations within the storage library.

It is still a further object of the present invention to provide a method and system for a storage library having robotic mechanisms which control the robotic mechanisms to move around the storage library along a looping travel path in the same direction such that the robotic mechanisms chase each other around the storage library to prevent contention between the robotic mechanisms for resources of the storage library.

In carrying out the above objects and other objects, the present invention provides an automated storage library for the storage and retrieval of cartridges and an associated method. The storage library includes a frame having a plurality of cartridge storage cells for storing cartridges and at least one cartridge player for playing a cartridge. At least two robotic mechanisms are each movable within the frame to mount a cartridge from a cartridge storage cell into the cartridge player and to dismount a cartridge from the cartridge player into a cartridge storage cell. A controller controls the robotic mechanisms to move in a first direction around the frame along a closed loop travel path such that one of the robotic mechanisms dismounts a cartridge from the cartridge player into a cartridge storage cell while another one of the robotic mechanism mounts another cartridge from another cartridge storage cell into the cartridge player. The controller controls the robotic mechanisms such that the one of the robotic mechanisms unloads the cartridge from the cartridge player prior to the other one of the robotic mechanisms loading the other cartridge into the cartridge player.

Preferably, the controller controls the robotic mechanisms to traverse around the frame along the first direction in the closed loop without reversing the course of movement. The frame includes a closed loop concentric row of cartridge storage cells and a cartridge player. The controller controls the robotic mechanisms to move in the first direction around the closed loop concentric row of cartridge storage cells and the cartridge player. The controller controls the robotic mechanisms to move in the first direction around the frame along the closed loop such that the robotic mechanisms avoid contention with access to the cartridge storage cells and the cartridge player.

Preferably, the controller provides a dismount drive command to a first robotic mechanism and a mount drive command to a second robotic mechanism for the first robotic mechanism to dismount the first cartridge while the second robotic mechanism mounts the second cartridge. The controller then provides a mount drive command to the first robotic mechanism and a dismount drive command to the second robotic mechanism for the first robotic mechanism to mount a third cartridge while the second robotic mechanism dismounts the second cartridge after the first robotic mechanism has dismounted the first cartridge and the second robotic mechanism has mounted the second cartridge. The controller then provides a dismount drive command to the first robotic mechanism and a mount drive command to the second robotic mechanism for the first robotic mechanism to dismount the third cartridge while the second robotic mechanism mounts a fourth cartridge.

The first robotic mechanism in response to the dismount drive command moves in the first direction along the closed loop to the cartridge player, removes the first cartridge from the cartridge player, moves in the first direction along the closed loop from the cartridge player to the first cartridge storage cell which is to house the first cartridge, and then loads the first cartridge into the first cartridge storage cell.

The second robotic mechanism in response to the mount drive command moves in the first direction along the closed loop to the second cartridge storage cell housing the second cartridge, removes the second cartridge from the second cartridge storage cell, moves in the first direction along the closed loop from the second cartridge storage cell to the cartridge player, and then loads the second cartridge into the cartridge player.

The frame may be a round frame, a rectangular frame, or the like. The closed loop may be a closed circular loop, a closed rectangular loop, a closed serpentine loop, or the like.

The above objects and other objects, features, and advantages of the present invention are readily apparent from the following detailed description of the best mode for carrying out the present invention when taken in connection with the accompanying drawings.

BEST MODES FOR CARRYING OUT THE INVENTION

In general, the present invention is a synchronous mounting and dismounting method and system for a storage library having multiple robotic mechanisms. The synchronous mounting and dismounting method and system makes the mount functions performed by the robotic mechanisms to be independent of the dismount functions performed by the robotic mechanisms. The robotic mechanisms move around a storage library along a "looping travel path" which allows the dismounting of media cartridges from locations within the storage library to be done independently as a background function to the mounting of media cartridges to other locations within the storage library.

A looping travel path is described by a physical layout where a robotic mechanism may be used in conjunction with another robotic mechanism such that there is no contention between the two robotic mechanisms during mounting and dismounting of different media cartridges from locations within the storage library. The physical layout is best described by a round storage library having multiple track concentric mounted robotic mechanisms. In addition to the round physical layout, other physical layouts may include square and serpentine layouts. Each physical layout provides a continuous robotic mechanism move path from media storage cells to media players to same media storage cells without reversing the course of travel of the robotic mechanisms.

The robotic mechanisms are controlled to force the movements of all of the robotic mechanisms to be in the same direction as they travel around the storage library. This enables the robotic mechanisms to always loop forward to get to any desired position within the storage library such that a state of operation can be achieved where no contention between the robotic mechanisms for storage library resources occurs. The robotic mechanisms loop forward to get out of the way of other robotic mechanisms such that the robotic mechanisms are chasing each other around in a circle. The performance of the storage library is improved because a robotic mechanism is made available to dismount media cartridge from a media player, i.e., tape drive, concurrent with a requested mount of a different media cartridge to the same media player. The move velocity profiles for the dismount cycle may be made slower to reduce stress on the dismounting components, while the mounting components would become less stressed as they would have a lower duty cycle because they do not have to do any dismounting.

Figure 1:
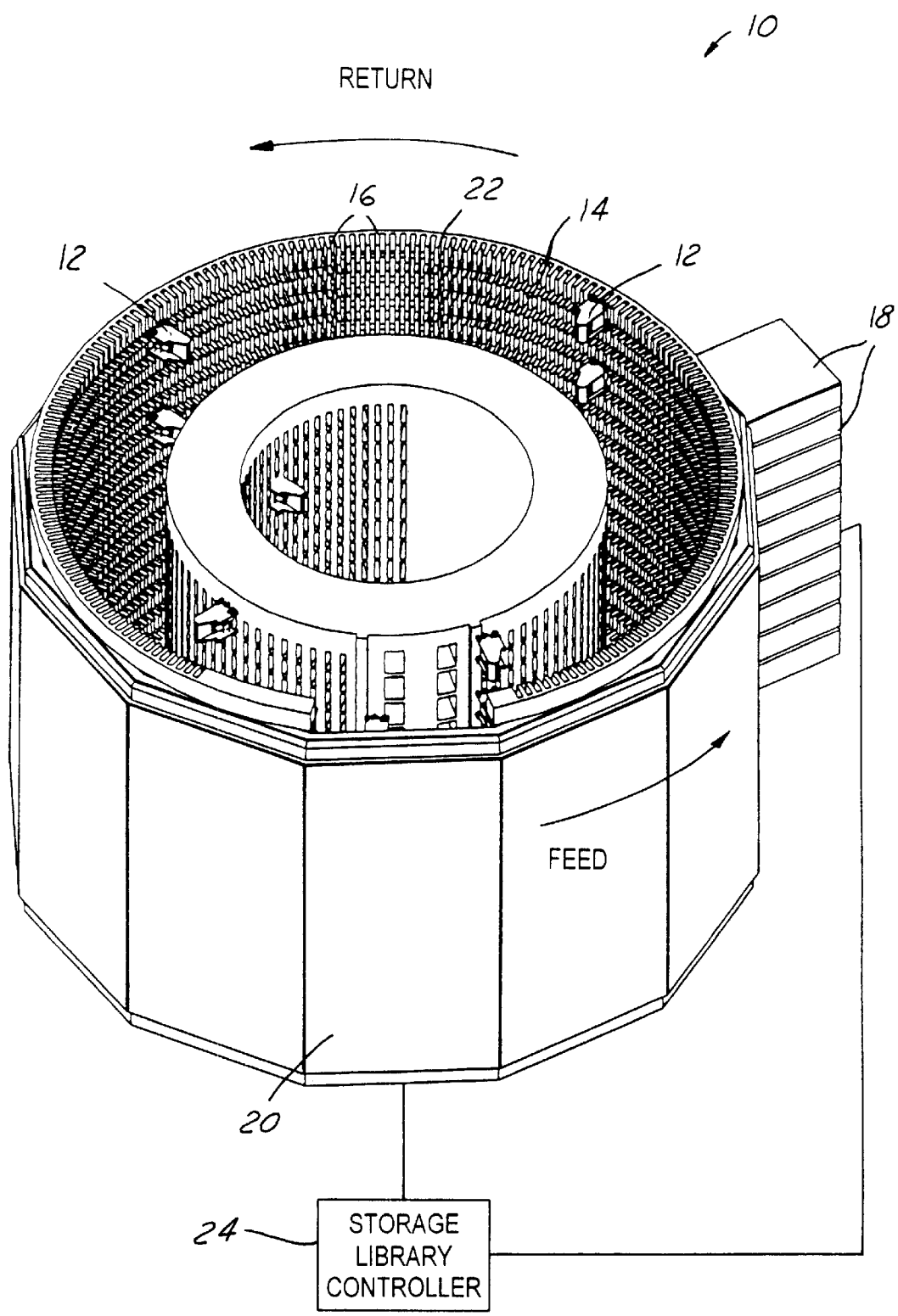
FIG. 1 illustrates a round automated storage library for use with the method and system of the present invention.

Referring now to FIG. 1, a round storage library 10 for use with the method and system of the present invention is shown. Storage library 10 includes multiple independent robotic mechanisms (robotic pods or accessors) 12 to enable the storage library to concurrently manipulate different media cartridges 14. Storage library 10 includes a concentric array of media cartridge storage cells 16 and media cartridge players 18 mounted in a frame 20. A system of tracks or rails 22 guide robotic mechanisms 12 through all of the locations in the array. Each pair of tracks 22 corresponds to a respective concentric row of the array of frame 20. A media cartridge player 18 and a subset of media cartridge storage cells 16 are positioned along each concentric row of the array of frame 20. Each media cartridge storage cell 16 is designed to house a single media cartridge 14. Each robotic mechanism 12 moves around storage library 10 along a concentric row to access media cartridge storage cells 16 and media cartridge players 18 positioned along the same row. Robotic mechanisms 12 contain a movable carriage that is capable of transporting robotic components, such as media cartridge pickers, bar code reading devices, and other task oriented sub-modules on tracks 22 of storage library 10.

Robotic mechanisms 12 are attached to frame 20 via concentric horizontal guide tracks 22 which serve to frame media cartridge storage cells 16 and media cartridge players 18 on the top and bottom sides thereof. Media cartridge storage cells 16 are populated with media cartridges 14 of any arbitrary type. Tracks 22 provide support of robotic mechanisms 12 in the vertical direction to oppose the force of gravity, and they also provide a meshing surface of a suitable design to impart traction in the horizontal direction for motive transport of the robotic mechanisms. Robotic mechanisms 12 each incorporate drive means for propulsion in the horizontal direction along guide tracks 22.

A storage library control unit (controller) 24 provides commands to robotic mechanisms 12 to manipulate media cartridges 14. Controller 24 communicates with each robotic mechanism 12 individually by radio frequency communication links, infrared communication links, or other wireless links. Wired communication links may also be used. Commands to robotic mechanisms 12 include movement along tracks 22, movement of media cartridges 14 into and out of the robotic mechanisms, reading bar codes on the media cartridges, and the like.

Controller 24 and robotic mechanisms 12 are operable with one another such that the controller knows the position of the robotic mechanisms within storage library 10 as they move about tracks 22. This is accomplished by mounting position sensors on robotic mechanisms 12 which provide information regarding the position of the robotic mechanisms to controller 24. This may also be accomplished by providing sensors on tracks 22 which are actuated to transmit a signal to controller 24 when a robotic mechanism 12 traverses a sensor on the track. This may further be accomplished by having robotic mechanisms 12 provide information regarding the speed and direction of their travels through storage library 10. Controller 24 is also operable with media cartridge storage cells 16 and media cartridge players 18 to know the location of media cartridges 14 during operation of storage library 10.

Controller 24 may also be in communication with media cartridge players 18. In one embodiment, controller 24 provides commands to mount and dismount media cartridges 14 into and out of media cartridge players 18. Controller 24 coordinates these commands with positioning commands to a robotic pod mechanism 12 that supplies or receives a media cartridge 14 to and from a media cartridge player 18. In another embodiment, an external source (not shown) provides the mount and dismount commands directly to media cartridge players 18. Here, controller 24 coordinates with the external source to position the proper robotic pod 12 adjacent media cartridge player 18 prior to the mount or dismount command being given to the media cartridge player.

Figure 2:
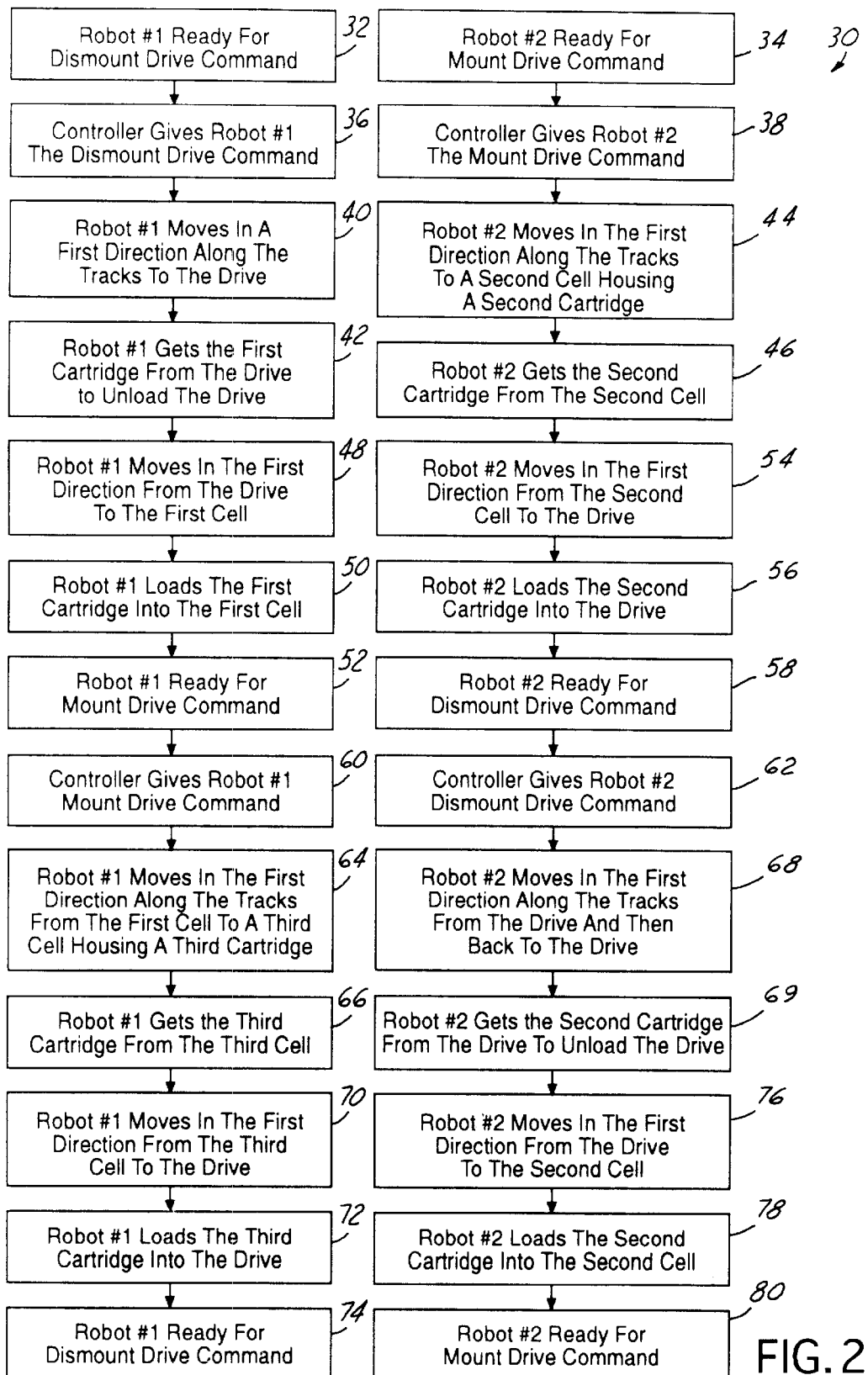
FIG. 2 illustrates a flow chart illustrating operation of the synchronous mounting and dismounting method and system for use with a storage library having multiple robotic mechanisms such as the storage library shown in FIG. 1.

Referring now to FIG. 2, with continual reference to FIG. 1, a flow chart 30 illustrating operation of the synchronous mounting and dismounting method and system for use with a storage library having multiple robotic mechanisms such as storage library 10 is shown. In general, two or more robotic mechanisms 12 move concentrically along a pair of tracks 22 to move along a row for loading and unloading media cartridges 14 into and out of media cartridge storage cells, i.e., cells, and media cartridge players 18, i.e., drives, located on the row. The robotic mechanisms 12 move concentrically along tracks 22 in a first direction about the row without reversing their course of travel. Each robotic mechanism 12 can move along tracks 22 in the first direction to move out of the way of another robotic mechanism thereby avoiding contention between the robotic mechanisms to cells 16 and drives 18.

Storage library 10 generally includes mechanics to allow robotic mechanisms 12 to run continuously in the first direction without reaching a state of lock up or reversal. For example, cable runs, mechanical stops, software counters, and the like are configured to allow robotic mechanisms 12 to continuously move along tracks 22 in the first direction.

The operation of the synchronous method and system for use with storage library 10 in accordance with the present invention will now be described in greater detail with reference to flow chart 30. To facilitate the description it will be assumed that only a pair of robotic mechanisms 12 are located on a pair of tracks 22 of storage library 10 for accessing the components located on the track. It will also be assumed that there is only one drive 18 located on tracks 22.

Initially, as shown in FIG. 2, a first robotic mechanism 12 (robot #1) is ready for a dismount drive command as shown in block 32 and a second robotic mechanism 12 (robot #2) is ready for a mount drive command as shown in block 34. Generally, in response to a dismount drive command, a robotic mechanism 12 moves to drive 18, removes a cartridge 14 from the drive, moves from the drive to an empty cell 16 which is to house the cartridge, and then loads the cartridge into the empty cell. In response to a mount drive command, a robotic mechanism 12 moves to a full cell 16 housing a cartridge 14, removes the cartridge from the full cell, moves from the full cell to drive 18, and then loads the cartridge into the drive.

In accordance with the present invention, controller 24 controls first and second robotic mechanisms 12 to synchronously mount and dismount a pair of cartridges 14 into and out of a drive 18. For instance, first robotic mechanism 12 performs a mounting function to get a first cartridge 14 from a first storage cell 16 and mount the first cartridge into drive 18. Synchronously with the mounting function, second robotic mechanism 12 performs a dismounting function to dismount a second cartridge 14 from the drive and place the second cartridge 14 into a second storage cell 16. The movement and actions of first and second robotic mechanisms 12 are coordinated such that second robotic mechanism 12 dismounts the second cartridge 14 from drive 18 prior to first robotic mechanism 12 mounting the first cartridge 14 into the drive.

Similarly, first robotic mechanism 12 performs a dismounting function to dismount second cartridge 14 from drive 18 and place the second cartridge into the second storage cell 16. Synchronously with the dismounting function, second robotic mechanism 12 performs a mounting function to get a third cartridge 14 from a third storage cell 16 and mount the third cartridge into the drive. The movements and actions of first and second robotic mechanisms 12 are coordinated such that first robotic mechanism 12 dismounts the second cartridge 14 from drive 18 prior to second robotic mechanism 12 mounting the third cartridge 14 into the drive.

During the mounting and dismounting functions, each of robotic mechanisms 12 moves in the first direction along tracks 22 to move toward the desired locations while not preventing access of the other robotic mechanism to a desired location. For instance, first robotic mechanism 12 moves in the first direction toward a cell 16 or drive 18 to access the cell or drive after second robotic mechanism 12 has moved away from the cell or drive. Similarly, second robotic mechanism 12 moves in the first direction toward a cell 16 or drive 18 to access a cell 16 or drive 18 to access the cell or drive after first robotic mechanism 12 has moved away from the cell or drive.

In operation, controller 24 gives a dismount drive command to robot #1 as shown in block 36. Controller 24 gives the dismount drive command to have robot #1 unload a first cartridge 14 from drive 18. Controller 24 synchronously gives a mount drive command to robot #2 as shown in block 38. Controller 24 gives the mount drive command to have robot #2 load a second cartridge 14 into drive 18 to replace the first cartridge 14.

In response to the dismount drive command, robot #1 moves in the first direction along tracks 22 to drive 18 as shown in block 40. If robot #2 is in the way of robot #1 and prevents access of robot #1 to drive 18, then robot #2 moves in the first direction along tracks 22 away from the drive. Robot #1 then gets the first cartridge 14 from drive 18 to unload the drive as shown in block 42.

In response to the mount drive command, robot #2 moves in the first direction along tracks 22 to a second cell 16 housing the second cartridge 14 as shown in block 44. If robot #1 is in the way of robot #2 while positioned at drive 18 and thereby preventing access of robot #2 to the second cell 16, then robot #1 moves in the first direction along tracks 22 away from the drive and the second cell. Robot #2 then gets the second cartridge 14 from the second cell 16 as shown in block 46.

To complete the dismount drive command, robot #1 moves in the first direction from drive 18 to the first cell 16 after removing the first cartridge 14 from the drive as shown in block 48. As before, if robot #2 is in the way of robot #1 while positioned at second cell 16 and thereby preventing access of robot #1 to the first cell 16, then robot #2 moves in the first direction along tracks 22 away from the first and second cells. Robot #1 then loads the first cartridge 14 into the first cell 16 as shown in block 50. Robot #1 is then ready for a mount drive command, as opposed to a dismount drive command, as shown in block 52.

To complete the mount drive command, robot #2 moves in the first direction from second cell 16 to drive 18 after getting the second cartridge 14 from the second cell as shown in block 54. As before, if robot #1 is in the way of robot #2 while positioned at first cell 16 or drive 18 and thereby preventing access of robot #2 to drive 18, then robot #1 moves away from first cell 16 or drive 18. Robot #2 then loads the second cartridge 14 into drive 18 as shown in block 56. Robot #2 is then ready for a dismount drive command, as opposed to a mount drive command, as shown in block 58.

The process then repeats with robot #1 performing a mount drive function while robot #2 performs a dismount drive function as shown in FIG. 2. Controller 24 gives robot #1 the mount drive command to mount a third cartridge 14 into drive 18 as shown in block 60. Controller 24 gives the mount drive command to have robot #1 load the third cartridge 14 into drive 18 to replace the second cartridge 14 located within the drive. Controller 24 synchronously gives a dismount drive command to have robot #2 unload the second cartridge 14 from drive 18 as shown in block 62. Controller 24 gives the dismount drive command to have robot #2 unload the second cartridge 14 from drive 18.

In response to the mount drive command, robot #1 moves in the first direction along tracks 22 from first cell 16 to a third cell 16 housing third cartridge 14 as shown in block 64. If robot #2 is in the way of robot #1 while positioned at second cell 16 and thereby preventing access of robot #1 to third cell 16, then robot #2 moves in the first direction along tracks 22 away from second cell 16 and third cell 16. Robot #1 then gets the third cartridge 14 from the third cell 16 as shown in block 66.

In response to the dismount drive command, robot #2 either is already located at drive 18 or moves in the first direction along tracks 22 from the drive to get out of the way of robot #1 while robot #1 is loading first cartridge 14 into first cell 16 and then back to the drive as shown in block 68. If robot #1 is in the way of robot #2 while positioned at either first cell 16 or third cell 16 and prevents access of robot #2 to drive 18, then robot #1 moves in the first direction along tracks 22 away from the first and second cells. Robot #2 then gets the second cartridge 14 from drive 18 to unload the drive as shown in block 69.

To complete the mount drive command, robot #1 moves in the first direction from third cell 16 to drive 18 after getting third cartridge 14 from the third cell as shown in block 70. As before, if robot #2 is in the way of robot #1 while positioned at second cell 16 or drive 18 and thereby preventing access of robot #1 to third cell 16, then robot #2 moves in the first direction away from the second cell or the drive and toward robot #1. Robot #1 then loads the third cartridge 14 into drive 18 as shown in block 72. Robot #1 is then ready for a dismount drive command, as opposed to a mount drive command, as shown in block 74.

To complete the dismount drive command, robot #2 moves in the first direction from drive 18 to the second cell 16 after removing the second cartridge from the drive as shown in block 76. As before, if robot #1 is in the way of robot #2 while positioned at either third cell 16 or drive 18 and thereby preventing access of robot #2 to the second cell 16, then robot #1 moves in the first direction away from the third cell and the drive. Robot #2 then loads the second cartridge 14 into the second cell 16 as shown in block 78. Robot #2 is then ready for a mount drive command, as opposed to a dismount drive command, as shown in block 80.

Figure 3:
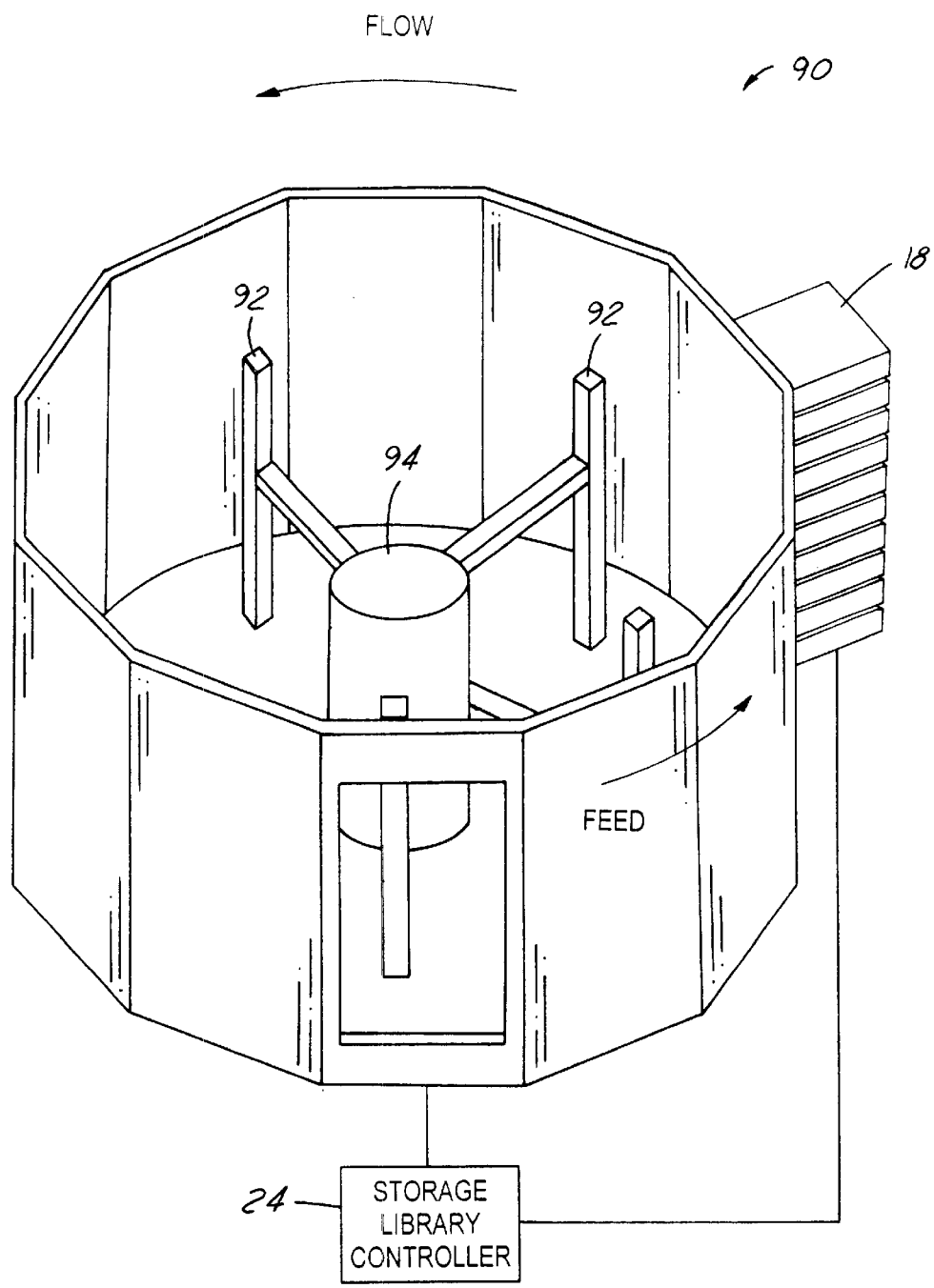
FIG. 3 illustrates another round automated storage library for use with the method and system of the present invention.

Referring now to FIG. 3, another round automated storage library 90 for use with the method and system of the present invention is shown. Storage library 90 include multiple arms 92 which rotate about a common axis 94 within the storage library. Arms 92 perform the same functions as robotic mechanisms 12 of storage library 10 to concurrently manipulate different media cartridges and drives 18 within storage library 90. Arms 92 be joined to rotate together with each other around storage library 90 or may be configured to rotate separately around the storage library.

In any event, as described with reference to robotic mechanisms 12, controller 24 controls arms 92 to rotate synchronously with one another to mount and dismount cartridges into and out of cells and drives 18. For instance, a first arm 92 performs a mounting function to get a first cartridge from a first storage cell and mount the first cartridge into a drive 18. Synchronously with the mounting function, a second arm 92 performs a dismounting function to dismount a second cartridge from the drive 18 and place the second cartridge into a second storage cell. The movement and actions of first and second arms 92 are coordinated such that second arm 92 dismounts the second cartridge from the drive prior to first arm 92 mounting the first cartridge into the drive 18.

Similarly, first arm 92 performs a dismounting function to dismount the second cartridge from drive 18 and place the second cartridge into the second storage cell. Synchronously with the dismounting function, second arm 92 performs a mounting function to get a third cartridge from a third storage cell and mount the third cartridge into drive 18. The movements and actions of first and second arms 92 are coordinated such that first arm 92 dismounts the second cartridge from drive 18 prior to second arm 92 mounting the third cartridge into the drive.

Figure 4:
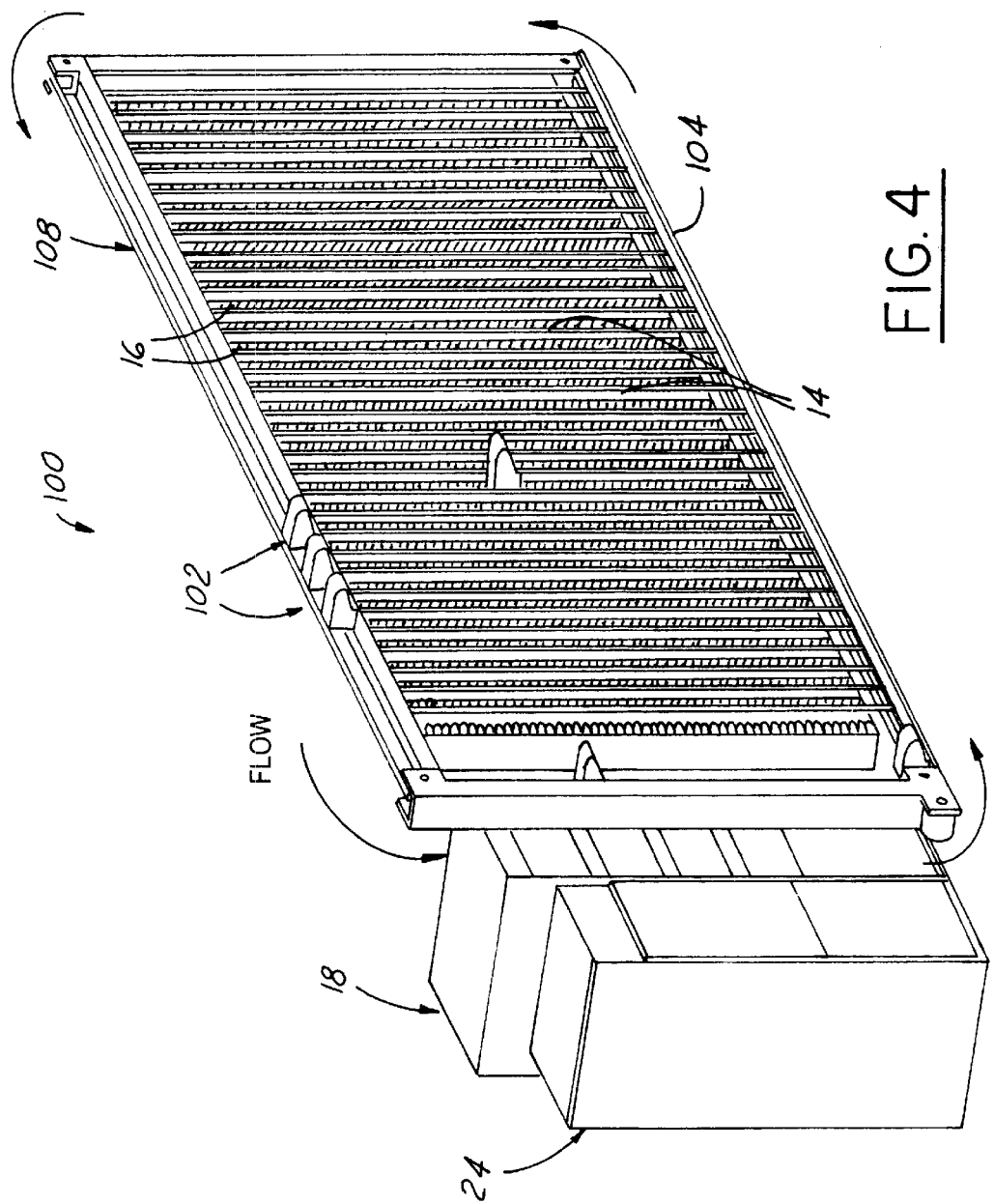
FIG. 4 illustrates a rectangular automated storage library for use with the method and system of the present invention.

Referring now to FIG. 4, a rectangular automated storage library 100 for use with the method and system of the present invention is shown. Storage library 100 includes multiple robotic mechanisms or pods 102 to enable the storage library to concurrently manipulate different media cartridges 14. Storage library 100 includes a two dimensional rectangular array of media cartridge storage cells 16 and media cartridge players 18 mounted in a rectangular frame 104. An X-Y linear system of drive rails and drive belts 108 guide robotic mechanisms 102 through all of the locations in the rectangular array. A media cartridge player 18 and a subset of media cartridge storage cells 16 are positioned along a row of the concentric array defined by frame 104. Each robotic mechanism 102 moves around storage library 100 along row to access media cartridge storage cells 16 and media cartridge players 18 positioned along the same row.

In operation, controller 24 controls a drive motor to drive the drive belts 108 to pull robotic mechanisms 102 along the rectangular array. Drive belt 108 moves in a first direction along the periphery of frame 104. When a robotic mechanism 102 is at the top of a desired column of frame 104, the robotic mechanism lets go of drive belt 108 and falls from the top of the column to the desired media cartridge cell 16 within the column. After either inserting or removing a cartridge into or out of the desired media cartridge 16 robotic mechanism 102 falls to the bottom of the column and hooks on to drive belt 108. Subsequently, drive belt 108 moves robotic mechanism 102 back up to the top of frame 104. Robotic mechanism 102 may then continue being pulled by drive belt 108 to access media cartridge players 18 positioned on a side of the periphery of frame 104.

As described with operation of robotic mechanisms 12 of storage library 10 and arms 92 of storage library 90, robotic mechanisms 102 synchronously mount and dismount cartridges into and out of media cartridge cells 16 and media cartridge players 18. For instance, a first robotic mechanism 102 performs a mounting function to get a first cartridge 14 from a first storage cell 16 and mount the first cartridge into a drive 18. Synchronously with the mounting function, a second robotic mechanism 102 performs a dismounting function to dismount a second cartridge 14 from drive 18 and place the second cartridge into a second storage cell 16. The movement and actions of first and second robotic mechanisms 102 are coordinated such that second robotic mechanism 102 dismounts second cartridge 14 from drive 18 prior to first robotic mechanism 102 mounting the first cartridge 14 into the drive.

Figure 5:
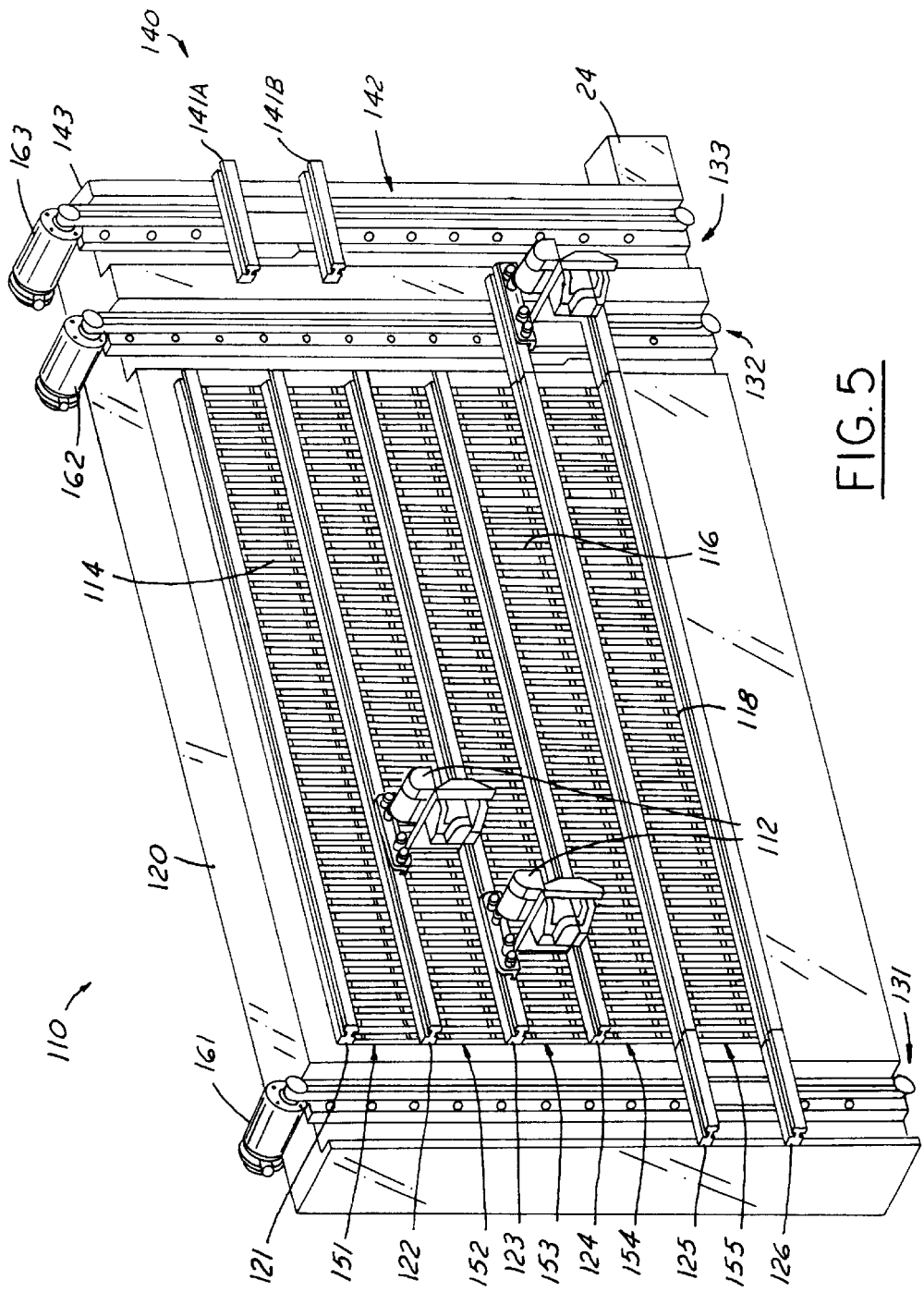
FIG. 5 illustrates another rectangular automated storage library for use with the method and system of the present invention.

Referring now to FIG. 5, another rectangular automated storage library 110 for use with the method and system of the present invention is shown. Storage library 110 include multiple robotic mechanisms 112 to enable the storage library to concurrently manipulate multiple media cartridges 114. Storage library 110 includes a two-dimensional vertical standing array of media cartridge storage cells 116 and media cartridge players 118 that are mounted in a frame 120. A system of tracks or rails 121–126 is used to guide robotic mechanisms 112 through all of the locations in the array.

Frame 120 is designed to receive a plurality of rows 151–155 of media cartridge storage cells 114. Media cartridge players 118 are shown in an arbitrary location in a horizontal row 155 at the bottom of frame 120, although storage library 110 can incorporate the media cartridge players at any location in the frame. Robotic mechanisms 112 are attached to frame 120 via horizontal guide tracks or rails 121–126 which serve to frame media cartridge storage cells 114 and media cartridge players 118. Tracks 121–126 provide support of robotic mechanisms 112 in the vertical direction to oppose the force of gravity, and they also provide a meshing surface of a suitable design to impart traction in the horizontal direction for motive transport of the robotic pods. Robotic mechanisms 112 each incorporate drive means for propulsion in the horizontal direction along guide tracks 121–126.

Storage library 110 further includes vertical elevator assemblies 131–133 that enable the transfer of robotic mechanisms 112 in the vertical direction. Each of vertical assemblies 131–133 includes a set of vertical rails 142 that extend substantially from the top of frame 120 to the bottom of the frame. Vertical rails 142 support elevator stations 140 each of which contain short horizontal track segments 141A, 141B that are identical in cross section to the main horizontal guide tracks 121–126. Elevator stations 140 are held in suspension by drive belts 143 which wrap around a respective drive pulley attached to a respective vertical drive motor 161–163. When a vertical displacement is required of any robotic mechanism 112, vertical elevator 140 is scheduled to move in alignment to the appropriate level of rows 151–155 to allow transfer of the robotic mechanism onto the elevator track segments 141A, 141B from the pair of horizontal tracks 121–126 that are juxtaposed and abutting to elevator track segments 141A, 141B. Once robotic mechanisms 112 is located on elevator station 140, drive motor 163 is activated to transport the robotic mechanism to a selected one of rows 151-155 and thence moves on to the pair of horizontal tracks 121-126 that correspond to the selected row.

As described with operation of storage libraries 10, 90, and 100, controller 24 controls robotic mechanisms 112 of storage library 110 to synchronously mount and dismount cartridges into and out of media cartridge cells 16 and media cartridge players 18.

Thus it is apparent that there has been provided, in accordance with the present invention, a synchronous mounting and dismounting method and system for a storage library having multiple robotic mechanisms that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An automated storage library for the storage and retrieval of cartridges, the storage library comprising:

a frame having cartridge storage cells for storing cartridges and at least one cartridge player for playing a cartridge;

at least two robotic mechanisms each movable within the frame to mount a cartridge from a cartridge storage cell into the cartridge player and to dismount a cartridge from the cartridge player into a cartridge storage cell; and a controller for controlling the robotic mechanisms to move in a first direction around the frame along a closed loop travel path without reversing the course of movement such that the robotic mechanisms avoid contention with access to the cartridge storage cells and the cartridge player, wherein the controller controls one of the robotic mechanisms to dismount a cartridge from the cartridge player into a cartridge storage cell while another one of the robotic mechanisms mounts another cartridge from another cartridge storage cell into the cartridge player, wherein the controller controls the one of the robotic mechanisms to unload the cartridge from the cartridge player prior to the other one of the robotic mechanisms loading the other cartridge into the cartridge player.

2. The storage library of claim 1 wherein:

the frame includes a closed loop concentric row of cartridge storage cells and a cartridge player, wherein the controller controls the robotic mechanisms to move in the first direction around the closed loop concentric row of cartridge storage cells and the cartridge player.

3. The system of claim 1 wherein:

the controller provides a dismount drive command to a first robotic mechanism and a mount drive command to a second robotic mechanism for the first robotic mechanism to dismount the first cartridge while the second robotic mechanism mounts the second cartridge.

4. The system of claim 3 wherein:

the controller provides a mount drive command to the first robotic mechanism and a dismount drive command to the second robotic mechanism for the first robotic mechanism to mount a third cartridge while the second robotic mechanism dismounts the second cartridge after the first robotic mechanism has dismounted the first cartridge and the second robotic mechanism has mounted the second cartridge.

5. The system of claim 4 wherein:

the controller provides a dismount drive command to the first robotic mechanism and a mount drive command to the second robotic mechanism for the first robotic mechanism to dismount the third cartridge while the second robotic mechanism mounts a fourth cartridge.

6. The system of claim 3 wherein:

the first robotic mechanism in response to the dismount drive command moves in the first direction along the closed loop to the cartridge player, removes the first cartridge from the cartridge player, moves in the first direction along the e closed loop from the cartridge player to the first cartridge storage cell which is to house the first cartridge, and then loads the first cartridge into the first cartridge storage cell.

7. The system of claim 6 wherein:

the second robotic mechanism in response to the mount drive command moves in the first direction along the closed loop to the second cartridge storage cell housing the second cartridge, removes the second cartridge from the second cartridge storage cell, moves in the first direction along the closed loop from the second cartridge storage cell to the cartridge player, and then loads the second cartridge into the cartridge player.

8. The system of claim 1 wherein:

the frame is a round frame and the closed loop is a closed circular loop.

9. The system of claim 1 wherein:

the frame is a rectangular frame and the closed loop is a closed rectangular loop.

10. The system of claim 1 wherein:

the closed loop is a closed serpentine loop.

11. A method for the storage and retrieval of cartridges in an automated storage library having a frame provided with cartridge storage cells for storing cartridges and at least one cartridge player for playing a cartridge and at least two robotic mechanisms each movable within the frame to mount a cartridge from a cartridge storage cell into the cartridge player and to dismount a cartridge from the cartridge player into a cartridge storage cell, the method comprising:

controlling the robotic mechanisms to move in a first direction around the frame along a closed loop travel path without reversing the course of movement such that the robotic mechanisms avoid contention with access to the cartridge storage cells and the cartridge player such that one of the robotic mechanisms dismounts a cartridge from the cartridge player into a cartridge storage cell while another one of the robotic mechanisms mounts another cartridge from another cartridge storage cell into the cartridge player; and controlling the robotic mechanisms such that the one of the robotic mechanisms unloads the cartridge from the cartridge player prior to the other one of the robotic mechanisms loading the other cartridge into the cartridge player.

12. The method of claim 11 wherein:

the frame includes a closed loop concentric row of cartridge storage cells and a media player, wherein controlling the robotic mechanisms to move in a first direction include controlling the robotic mechanisms to move in the first direction around the closed loop concentric row of cartridge storage cells and the cartridge player.

13. The method of claim 11 further comprising:

providing a dismount drive command to a first robotic mechanism and a mount drive command to a second robotic mechanism for the first robotic mechanism to dismount the first cartridge while the second robotic mechanism mounts the second cartridge.

14. The method of claim 13 further comprising:

providing a mount drive command to the first robotic mechanism and a dismount drive command to the second robotic mechanism for the first robotic mechanism to mount a third cartridge while the second robotic mechanism dismounts the second cartridge after the first robotic mechanism has dismounted the first cartridge and the second robotic mechanism has mounted the second cartridge.

15. The method of claim 14 further comprising:

providing a dismount drive command to the first robotic mechanism and a mount drive command to the second robotic mechanism for the first robotic mechanism to dismount the third cartridge while the second robotic mechanism mounts a fourth cartridge.

\* \* \* \* \*